(12) United States Patent
Fronberg (10) Patent No.: US 6,625,680 B1
(45) Date of Patent: Sep. 23, 2003

(54) SYSTEM AND METHOD FOR PROCESSING CIRCUIT CARD CONNECTOR AND REDUNDANCY EVENTS

(75) Inventor: Eric N. Fronberg, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/375,699

(22) Filed: Aug. 16, 1999

(51) Int. Cl.$^7$ ............................................. G06F 15/46
(52) U.S. Cl. .................... 710/300; 710/104; 710/10; 710/15
(58) Field of Search ................ 710/2, 8–10, 18–19, 710/100, 104, 300–304

(56) References Cited

U.S. PATENT DOCUMENTS

| | | | | |
|---|---|---|---|---|
| 5,634,132 A | * | 5/1997 | Pearce et al. | 713/300 |
| 5,751,710 A | | 5/1998 | Crowther et al. | 370/423 |
| 5,793,987 A | | 8/1998 | Quackenbush et al. | 395/280 |
| 5,887,145 A | * | 3/1999 | Harari et al. | 710/102 |
| 5,935,228 A | * | 8/1999 | Shinomura | 710/102 |
| 6,035,355 A | * | 3/2000 | Kelley et al. | 710/101 |
| 6,061,746 A | * | 5/2000 | Stanley et al. | 710/10 |
| 6,145,046 A | * | 11/2000 | Jones | 710/129 |
| 6,189,050 B1 | * | 2/2001 | Sakarda | 710/18 |
| 6,216,188 B1 | * | 4/2001 | Endo et al. | 710/103 |
| 6,243,774 B1 | * | 6/2001 | Eide et al. | 710/103 |
| 6,247,079 B1 | * | 6/2001 | Papa et al. | 710/13 |
| 6,263,305 B1 | * | 7/2001 | Yamaga | 703/25 |

* cited by examiner

*Primary Examiner*—Christopher B. Shin
(74) *Attorney, Agent, or Firm*—Baker Botts L.L.P.

(57) ABSTRACT

A system for processing circuit card events includes a circuit board having a first connector and a second connector. The circuit board generates connector information indicating whether a first circuit card is coupled to the first connector and whether a second circuit card is coupled to the second connector. A memory stores a plurality of software modules and a first state of the circuit board. A processor coupled to the circuit board and the memory determines a second state of the circuit board based upon the connector information. The processor further selects at least one software module for execution based upon the first state and the second state of the circuit board.

58 Claims, 4 Drawing Sheets

| TRANSITION INFORMATION | EVENT INFORMATION | SOFTWARE MODULE INFORMATION |
|---|---|---|
| 102ab | INSERT CARD 20a | 42ab |
| 102ba | REMOVE CARD 20a | 42ba |
| 102ac | INSERT CARD 20b | 42ac |
| 102ca | REMOVE CARD 20b | 42ca |
| 102bd | INSERT CARD 20b | 42bd |
| 102db | REMOVE CARD 20b | 42db |
| 102cd | INSERT CARD 20a | 42cd |
| 102dc | REMOVE CARD 20a | 42dc |
| 102ef | INSERT CARD 20a | 42ef |
| 102fe | REMOVE CARD 20a | 42fe |
| 102eg | INSERT CARD 20b | 42eg |
| 102ge | REMOVE CARD 20b | 42ge |
| 102fh | INSERT CARD 20b | 42fh |
| 102hf | REMOVE CARD 20b | 42hf |
| 102gh | INSERT CARD 20a | 42gh |
| 102hg | REMOVE CARD 20a | 42hg |
| 102ae | ENABLE REDUNDANCY | – |
| 102ea | DISABLE REDUNDANCY | – |
| 102bf | ENABLE REDUNDANCY | – |
| 102fb | DISABLE REDUNDANCY | – |
| 102cg | ENABLE REDUNDANCY | 42cg |
| 102gc | DISABLE REDUNDANCY | 42gc |
| 102dh | ENABLE REDUNDANCY | 42dh |
| 102hd | DISABLE REDUNDANCY | 42hd |
| 102ag | ENABLE REDUNDANCY/INSERT CARD 20b | 42ag |
| 102af | ENABLE REDUNDANCY/INSERT CARD 20a | 42af |
| 102ah | ENABLE REDUNDANCY/INSERT CARD 20a AND CARD 20b | 42ah |

SYSTEM AND METHOD FOR PROCESSING CIRCUIT CARD CONNECTOR AND REDUNDANCY EVENTS

TECHNICAL FIELD OF THE INVENTION

This invention relates in general to electronic devices, and more particularly to a system for processing circuit card connector and redundancy events.

BACKGROUND OF THE INVENTION

Circuit cards couple to a circuit board to provide enhanced services and functionality to the circuit board. The condition of the circuit board is determined in part by whether particular circuit cards are coupled to or decoupled from the circuit board. The condition of the circuit board generally determines the configuration and operation of various components associated with the circuit board. Therefore, the configuration and operation of the components may depend upon the dynamic coupling and decoupling of circuit cards with the circuit board.

Because the condition of a circuit board varies during operation as a result of the dynamic coupling and decoupling of particular circuit cards, the proper configuration and operation of various components associated with the circuit board may not be readily determined. One approach attempts to reconfigure each component to a known condition and then configure particular components in response to the coupling or decoupling of the particular circuit cards. A drawback to this approach is that components that are not affected by the coupling and decoupling of the particular circuit cards may be unnecessarily modified.

SUMMARY OF THE INVENTION

In accordance with the present invention, a system for processing circuit card connector and redundancy events is provided which substantially eliminates or reduces disadvantages and problems associated with previous electronic devices.

In accordance with one embodiment of the present invention, a system for processing circuit card events includes a circuit board having a first connector and a second connector. The circuit board generates connector information indicating whether a first circuit card is coupled to the first connector and whether a second circuit card is coupled to the second connector. A memory stores a plurality of software modules and a first state of the circuit board. A processor coupled to the circuit board and the memory determines a second state of the circuit board based upon the connector information. The processor further selects at least one software module for execution. The software module is selected based upon the first state and the second state of the circuit board.

Another embodiment of the present invention is a method for processing circuit card events that includes storing a first state of a circuit board. The method continues by receiving connector information indicating whether a first circuit card is coupled to a first connector of the circuit board and whether a second circuit card is coupled to a second connector of the circuit board. The method continues by determining a second state of the circuit board based upon the connector information. The method concludes by selecting at least one software module to execute based upon the first state and the second state of the circuit board.

Technical advantages of the present invention include a system that tracks the dynamic coupling and decoupling of circuit cards with a circuit board. The coupling and/or decoupling of a circuit cards is generally referred to as a connector event. In response to the occurrence of a connector event, the system may determine the states of the circuit board based in part upon the condition of the circuit cards prior to and subsequent to the connector event. In response to a transition in states of the circuit board, the system executes at least one software module to configure one or more hardware/software constructs associated with the circuit board. In this respect, the system provides a mechanism by which to track the dynamic coupling and decoupling of circuit cards with a circuit board and, in response, to control the configuration of a hardware/software construct associated with the circuit board.

Other technical advantages of the present invention include the operation of a circuit board in a redundancy mode. A pair of circuit cards coupled to a circuit board may provide substantially the same services and functionality to the circuit board if the circuit board is operating in the redundancy mode. Therefore, while a circuit board operates in a redundancy mode, a pair of circuit cards may operate in tandem to provide a measure of protection to the operation of the circuit board. For example, a first circuit card may provide primary functionality to a circuit board. Should the first circuit card fail or unexpectedly cease operation, a second circuit card may operate as a backup to provide substantially similar functionality to the circuit board. A redundancy event may enable and/or disable the redundancy mode of a circuit card. In response to a redundancy event, the system may determine the states of the circuit board based in part upon the condition of the circuit cards prior to and subsequent to the redundancy event. In response to a transition in states of the circuit board, the system executes at least one software module to configure one or more hardware/software constructs associated with the circuit board.

Other technical advantages are readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, in which like reference numbers indicate like features and wherein.

DETAILED DESCRIPTION OF THE INVENTION

Figure 1:
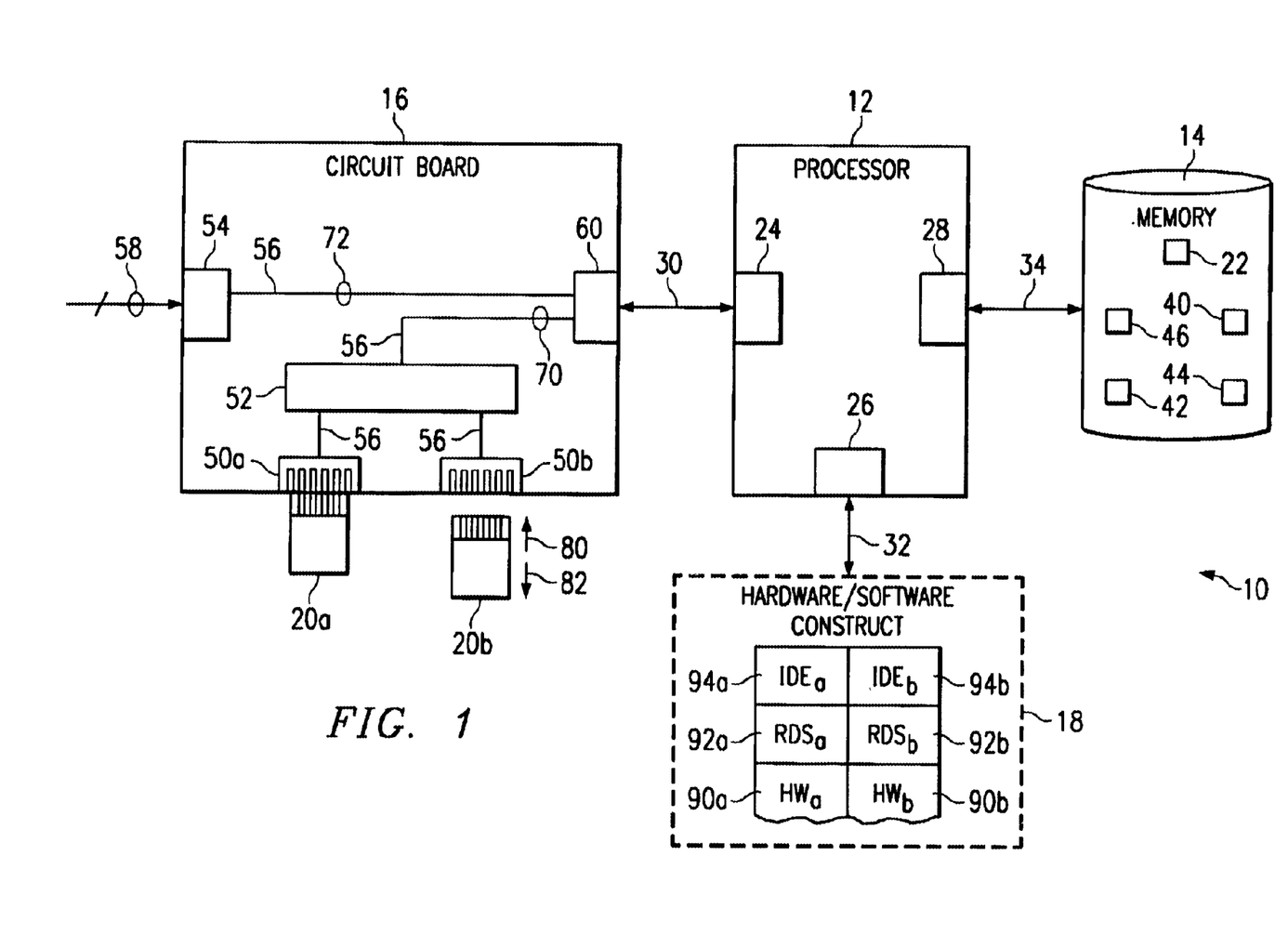
FIG. 1 illustrates a system for processing circuit card connector and redundancy events according to the present invention.

FIG. 1 illustrates a system 10 for processing circuit card connector and redundancy events according to the present invention. System 10 includes a processor 12 coupled to a memory 14, a circuit board 16, and a hardware/software construct 18. In general, circuit cards 20a and 20b may be inserted and/or removed from circuit board 16 during operation of system 10 to provide additional services and functionality to circuit board 16. The states of circuit board 16 during operation are defined in part by whether one or both of circuit cards 20a–20b are inserted and/or removed from circuit board 16. Processor 12 tracks the online insertion and removal of circuit cards 20a and 20b to determine the operational states of circuit board 16. Processor 12 initiates the execution of one or more selected software modules to configure hardware/software construct 18 according to the operational states of circuit board 16.

Processor 12 comprises a central processing unit associated with a computer system, such as a mainframe, a work station, or any other suitable general purpose data processing facility that operates in any suitable operating system environment, such as, for example, MS-Dos, PC-Dos, OS2, MacOS™, or Windows™. Processor 12 includes interfaces 24, 26, and 28. Interfaces 24–28 comprise any suitable combination of hardware and software that supports the communication of information with the various components of system 10 using links 30, 32, and 34, respectively. Links 30–34 comprise any suitable communication paths between the specified components of system 10. In general, processor 12 executes state tracking application 22 to determine the operational states of circuit board 16 and to configure hardware/software construct 18 accordingly.

Memory 14 comprises a file, a stack, or any other suitable organization of volatile or non-volatile memory that stores state tracking application 22, and any associated files, tables, or buffers in RAM, ROM, CD-ROM, or any other form of magnetic or optical storage. For example, memory 14 stores state information 40 generated by processor 12 and associated with the operational states of circuit board 16. Furthermore, memory 14 stores software modules 42 used by processor 12 to configure hardware/software construct 18, and a table 44 associating software modules 42 with state information 40. Memory 14 further includes a queue 46 to store any suitable arrangement of information associated with any number and combination of connector events and/or redundancy events.

Circuit board 16 comprises any suitable number and configuration of electronic components supported by any suitable base or frame. In a particular embodiment of the present invention, circuit board 16 comprises a portion of a network communication device, such as a switch or router, for use in a communication system. Circuit board 16 includes one or more pairs of connectors 50, such as a first connector 50a and a second connector 30b. A connector 50 may include any number of metal leads, contacts, or guides used to provide an electrical connection between circuit board 16 and a circuit card 20.

Circuit board 16 further includes a detector 52 coupled to connectors 50 using any suitable electrical wiring 56. Detector 52 comprises any number and combination of electrical components that detect connector events associated with connectors 50 and circuit cards 20, and generates connector information 70 in response to the detected connector events. Generally, a connector event comprises the coupling of a circuit card 20 with a corresponding connector 50 and/or a decoupling of a circuit card 20 from a corresponding connector 50.

Circuit board 16 further includes a detector 54 that comprises any number and combination of electrical components that detect a redundancy event associated with a control signal 58, and generate redundancy information 72 in response to the detected redundancy event. In general, control signal 58 comprises any suitable data signal that enables and/or disables the operation of circuit board 16 in a redundancy mode. Circuit cards 20a and 20b, coupled to a particular pair of connectors 50a and 50b, provide substantially the same services and functionality to circuit board 16 as each other if circuit board 16 is operating in a redundancy mode. Generally, a redundancy event comprises the act of enabling or disabling the redundancy mode of circuit board 16.

Connector information 70 comprises any suitable arrangement of data that indicates whether first circuit card 20a is coupled to first connector 50a and/or whether second circuit card 20b is coupled to second connector 50b, respectively. Redundancy information 72 comprises any suitable arrangement of data that indicates whether circuit board 16 is operating in the redundancy mode. In a particular embodiment of the present invention, connector information 70 is associated with an interrupt signal that informs processor 12 that a connector event has occurred. Similarly, redundancy information 72 is associated with an interrupt signal that informs processor 12 that a redundancy event has occurred.

Circuit cards 20 comprise any suitable number and configuration of electrical components supported by a base or frame that couples to a connector 50 to provide additional services or functionality to circuit board 16. In one embodiment of the present invention, circuit cards 20 comprise network interface cards for use in a communication system. In a particular embodiment, circuit cards 20 include first connectors that couple to circuit board 16 and second connectors that couple to another network communication device so that circuit card 20 provides a data path from circuit board 16 to the other network communication device. In general, circuit cards 20 may be inserted into connectors 50 in a direction indicated by arrow 80 and/or removed from connectors 50 in a direction indicated by arrow 82.

Circuit cards 20a and 20b, coupled to connectors 50a and 50b, provide substantially the same services and functionality to circuit board 16 as each other if circuit board 16 is operating in the redundancy mode. A technical advantage provided by this aspect of the present invention is that while circuit board 16 operates in the redundancy mode, circuit cards 20 operate in tandem to provide a measure of protection to the operation of circuit board 16. In one example, a circuit card 20a may provide a primary functionality to circuit board 16. Should circuit card 20a malfunction or unexpectedly cease operation, circuit card 20b provides backup functionality to circuit board 16. In another example, each of circuit cards 50a and 50b provide substantially the same services and functionality to circuit board 16 simultaneously. Should either of circuit cards 20a or 20b malfunction or unexpectedly cease operation, the other card 20 continues to provide services and functionality to circuit board 16. By operating a pair of circuit cards 20 in tandem, as in the redundancy mode, the operation of circuit board 16 is not interrupted by the malfunctioning or failure of a single circuit card 20. If circuit board 16 is not operating in the redundancy mode, then circuit card 20a generally provides services and functionality to circuit board 16 that is independent of the services and functionality provided by circuit card 20b. Therefore, circuit board 16 may or may not operate in a redundancy mode to provide the configuration of circuit card 20 that supports the optimal operation of circuit board 16.

Hardware components 90a and 90b comprise any suitable number and combination of electrical components in system 10 that are rendered operational or otherwise supported by the insertion of a corresponding circuit card 20a or 20b in circuit board 16. In a particular embodiment, hardware, components 90a and 90b comprise the electrical components of circuit cards 20a and 20b inserted in circuit board 16, respectively.

An RDS 92 comprises any suitable software data structure that maintains information for an associated hardware component 90 and controls the operation of the associated hardware component 90 on behalf of other components in system 10. For example, RDS 92a is associated with and controls the operation of hardware component 90a, and RDS 92b is associated with and controls the operation of hardware component 90b.

Hardware components 90a and 90B comprise any suitable number and combination of electrical components in system 10 that are rendered operational or otherwise supported by the insertion of a corresponding circuit card 20a or 20b in circuit board 16. In a particular embodiment, hardware components 90a and 90B comprise the electrical components of circuit cards 20a and 20b inserted in circuit board 16, respectively.

An RDS 92 comprises any suitable software data structure that maintains information for an associated hardware component 90 and controls the operation of the associated hardware component 90 on behalf of other components in system 10. For example, RDS 92a is associated with and controls the operation of hardware component 90a, and RDS 92B is associated with and controls the operation of hardware component 90b.

IDE 94 comprises any suitable software data structure that interfaces one or more appropriate hardware components 90 to other components of system 10 using one more appropriate RDS 92. For example, a single IDE 94, such as IDE 94a, may interface multiple hardware components 90, such as hardware components 90a and 90b, to other components of system 10 using RDS 92a and 92b when circuit board 16 is operating in the redundancy mode. In general, IDE 94 processes information and data to control the operation of associated hardware components 90 via the appropriate RDS 92.

In operation of system 10, either of circuit cards 20a or 20b are coupled to or decoupled from connectors 50a and 50b of circuit board 16 to define a connector event. Detector 52 generates connector information 70 indicating whether circuit card 20a is coupled to connector 50a and/or whether circuit card 20b is coupled to connector 50b, subsequent to the connector event. In addition, detector 54 may receive a control signal 58 enabling or disabling the redundancy mode of circuit board 16 to define a redundancy event. Detector 54 generates redundancy information 72 indicating whether circuit board 16 is operating in the redundancy mode subsequent to the redundancy event. If circuit board 16 is operating in the redundancy mode, circuit cards 20a and 20b provide substantially the same services and functionality to circuit board 16, as described above. Interface 60 of circuit board 16 communicates connector information 70 and redundancy information 72 to interface 24 of processor 12 using link 30.

Memory 14 stores state information 40 indicating a first state of circuit board 16. The first state of circuit board 16 indicates whether circuit card 20a was coupled to connector 50a prior to the connector event; whether circuit card 20b was coupled to connector 50b prior to the connector event; and whether circuit board 16,was operating in the redundancy mode prior to the redundancy event. Processor 12 determines a second state of circuit board 16 based upon one or more of connector information 70 and redundancy information 72. The second state of circuit board 16 indicates whether circuit card 20a is coupled to connector 50a subsequent to the connector event; whether circuit card 20b is coupled to connector 50b subsequent to the connector event; and whether circuit board 16 is operating in the redundancy mode subsequent to the redundancy event. Processor 12 selects a software module 42 for execution based upon the first state of circuit board 16 stored in memory 14 and the second state of circuit board 16 determined by processor 12.

The selected software modules 42 associate one or more appropriate IDE 94 and RDS 92 with the appropriate hardware components 90 of hardware/software construct 18. In this respect, processor 12 configures hardware/software construct 18 according to the transition of operational states of circuit board 16. IDE 94 interfaces the appropriate hardware components 90 of hardware/software construct 18 to the other components of system 10 using one or more RDS 92.

Memory 14 stores the second state of circuit board 16 determined by processor 12 in state information 40. Upon detecting one or more other connector events and/or redundancy events, circuit board 16 communicates connector information 70 and/or redundancy information 72 to processor 12. Again, processor 12 determines the operational states of circuit board 16 prior to and subsequent to the connector and/or redundancy events to select one or more software modules 42 for execution. The appropriate software modules 42 again configure hardware/software construct 18 to operate in a manner consistent with the transition of operational states of circuit board 16. In one embodiment of system 10, queue 46 stores information, such as information 70 and 72, associated with connector events and/or redundancy events. Processor 12 processes these events in a particular order associated with queue 16, such as in the order of occurrence of the events.

Figure 2:
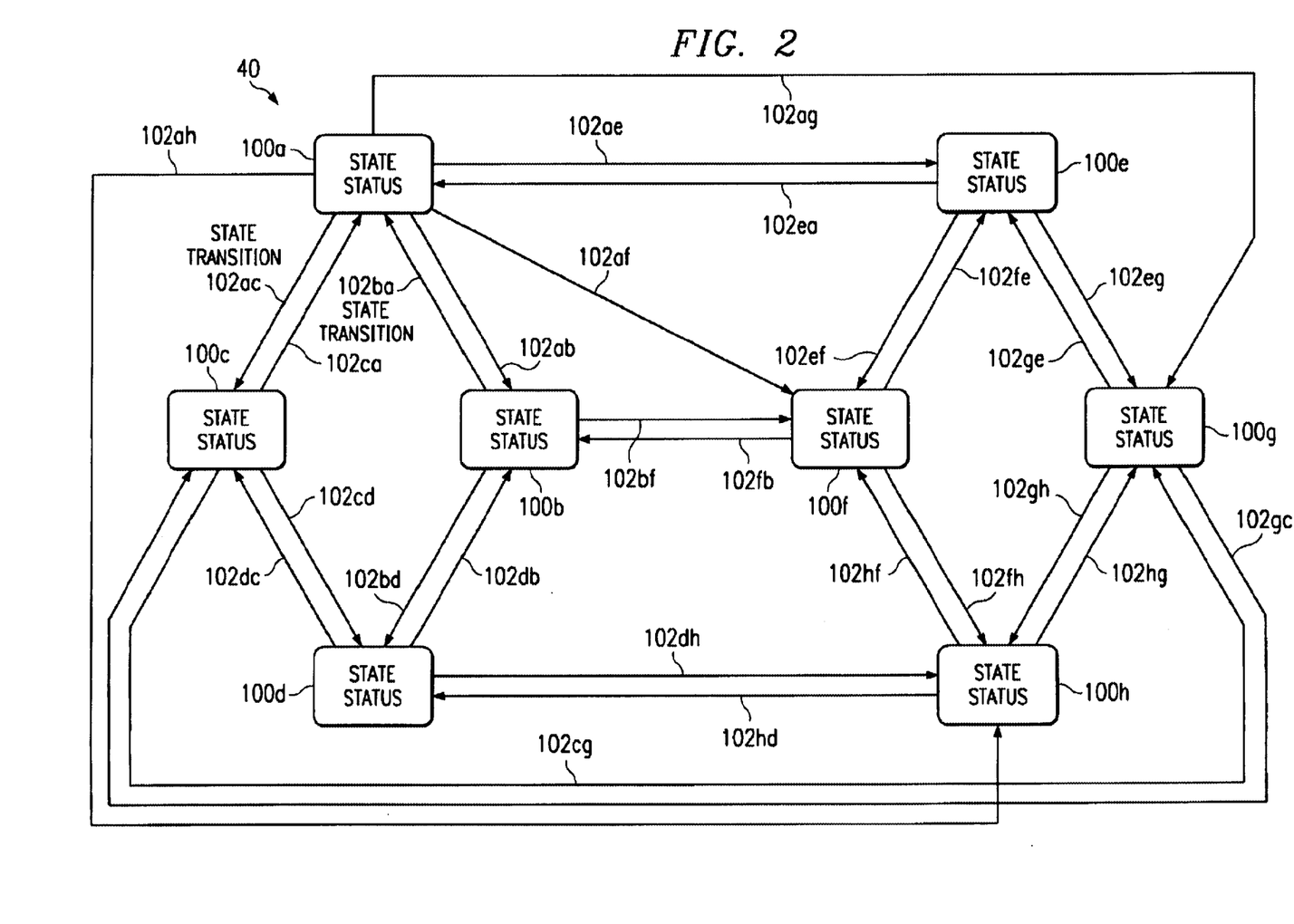
FIG. 2 illustrates one embodiment of state information used by the system.

FIG. 2 illustrates one embodiment of state information 40 used by system 10. State information 40 includes state status information 100 and state transition information 102. State status information 100 comprises any suitable arrangement of information indicating the operational states of circuit board 16. Referring to FIG. 2, for example, state status information 100a indicates that circuit card 20a is decoupled from connector 50a, circuit card 20b is decoupled from connector 50b, and circuit board 16 is not operating in the redundancy mode. State status information 100b indicates that circuit card 20a is coupled to connector 50a, circuit card 20b is decoupled from connector 50b, and circuit board 16 is not operating in the redundancy mode. State status information 100c indicates that circuit card 20a is decoupled from connector 50a, circuit card 20b is coupled to connector 50b, and circuit board 16 is not operating in the redundancy mode. State status information 100d indicates that circuit card 20a is coupled to connector 50a, circuit card 20b is coupled to connector 50b, and circuit board 16 is not operating in the redundancy mode.

The remaining states of circuit board 16 illustrated in FIG. 2 refer to circuit board 16 operating in the redundancy mode. For example, state status information 100e indicates that circuit card 20a is decoupled from connector 50a, circuit card 20b is decoupled from connector 50b, and circuit board 16 is operating in the redundancy mode. State status information 100f indicates that circuit card 20a is coupled to connector 50a, circuit card 20b is decoupled from connector 50b, and circuit board 16 is operating in the redundancy mode. State status information 100g indicates that circuit card 20a is decoupled from connector 50a, circuit card 20b is coupled to connector 50b, and circuit board 16 is operating in the redundancy mode. State status information 100h indicates that circuit card 20a is coupled to connector 50a, circuit card 20b is coupled to connector 50b, and circuit board 16 is operating in the redundancy mode.

State transition information 102 indicates a transition in the operational states of circuit board 16 from a first state to a second state in response to a connector event and/or a redundancy event. Generally, processor 12 processes each individual event independently from other events in a serial fashion such that events are stored in queue 46 and individually processed, such as, for example, in the order of occurrence. For example, assuming that the first state of circuit board 16 is defined by state status information 100a, a first connector event couples circuit card 20a to connector 50a of circuit board 16. Any number of connector and/or redundancy events may occur subsequent to the first connector event. Information associated with each of the events, such as information 70 and 72, is stored in queue 46 and processed serially.

Processor 12 determines that the second state of circuit board 16 is indicated by state status information 100b using, for example, connector information 70 defining the first connector event. Therefore, the first state of circuit board 16 is defined by state status information 100a prior to the first connector event and the second state of circuit board 16 is defined by state status information 100b subsequent to the first connector event. Processor 12 configures hardware/software construct 18 by executing a particular software module 42 associated with state transition information 102ab as described in greater detail with reference to FIG. 3. Processor 12 prepares to process any subsequent connector and/or redundancy events by defining the current state of circuit board 16 as the new first state of circuit board 16. Therefore, the operational state of circuit board 16 defined by state status information 100b becomes the new first state of circuit board 16.

Processor 12 serially processes the remaining events for which information is stored in queue 46. If the ensuing event is a redundancy event enabling the redundancy mode of circuit board 16, processor 12 determines that the second state of circuit board 16 is defined by state status information 100f, based upon redundancy information 72. If the ensuing event is a connector event coupling circuit card 20b to connector 50b, processor 12 determines that the second state of circuit board 16 is defined by state status information 100d. If the ensuing event is a connector event decoupling circuit card 20a from connector 50a of circuit board 16, processor 12 determines that the second state of circuit board 16 is defined by state status information 100a. Therefore, in one embodiment of the present invention, processor 12 serially processes the connector and/or redundancy events occurring on circuit board 16. Although the serial processing of events for which information is stored in queue 46 is detailed with respect to processing events in the order of occurrence, it should be understood that processor 12 may process events in any suitable order to perform the unique features and functions of the present invention.

In a particular embodiment of the present invention, processor 12 processes multiple connector events and/or redundancy events substantially simultaneously. For example, assuming state status information 100a defines the first state of circuit board 16, a connector event couples circuit card 20a to connector 50a of circuit board 16 and, substantially simultaneously, a redundancy event enables the redundancy mode of circuit board 16. In this embodiment, processor 12 determines that the second state of circuit board 16 is defined by state status information 100f. Accordingly, processor 12 initiates the execution of software module 42 associated with state transition information 102af rather than multiple software modules 42 associated with each of state transition information 100ab and 102bf. In this respect, processor 12 may process multiple events substantially simultaneously.

Together, state status information 100 and state transition information 102 define a first state of circuit board 16 and a second state of circuit board 16. The first state of circuit board 16 describes the operational state of circuit board 16 prior to a connector event and/or a redundancy event. The second state of circuit board 16 describes the operational state of circuit board 16 subsequent to the connector event and/or the redundancy event. As will be described in greater detail below with reference to FIG. 3, processor 12 selects one or more software modules 42 for execution based upon state transition information 102 between a particular first state and a particular second state of circuit board 16.

Figure 3:
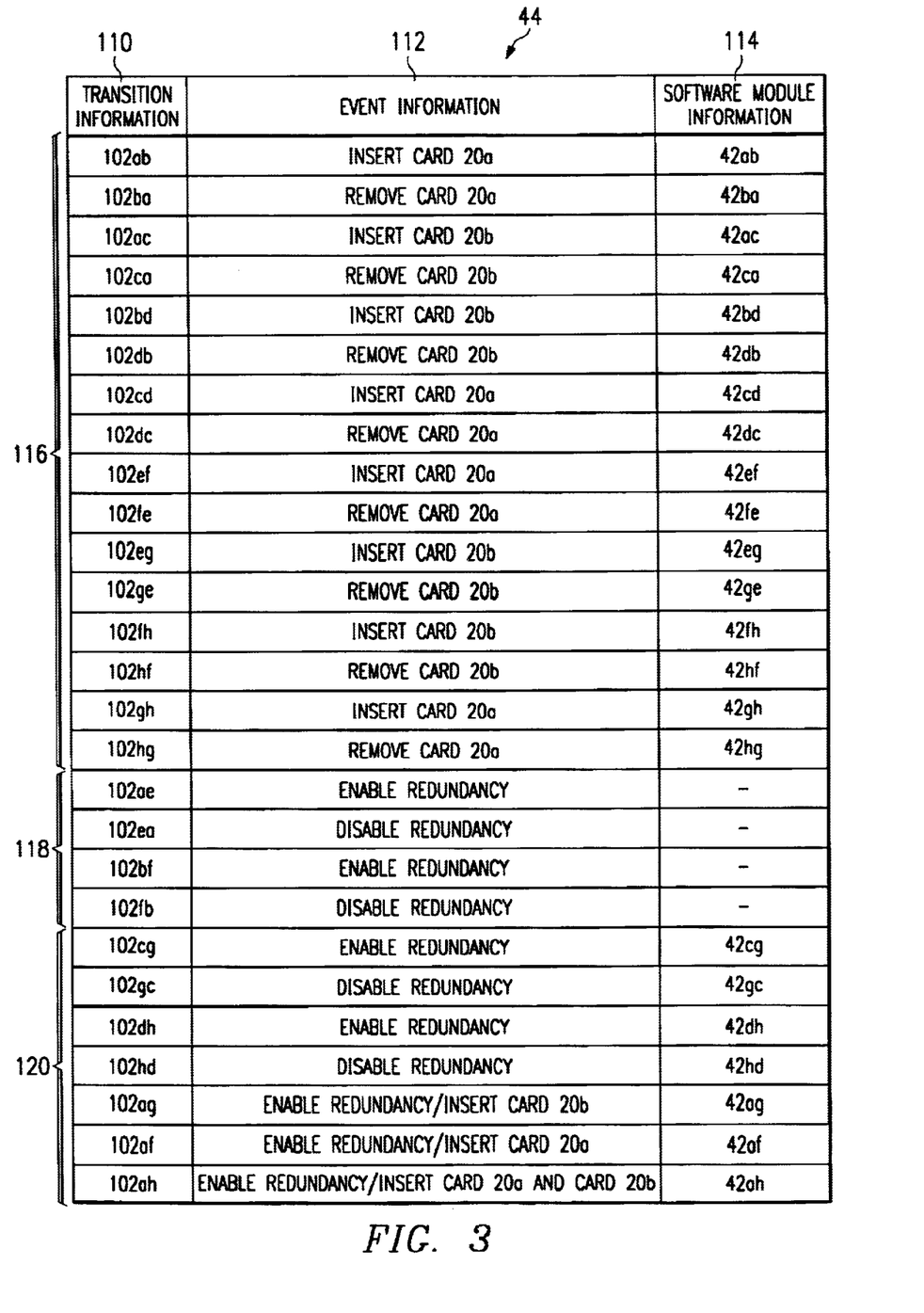
FIG. 3 illustrates one embodiment of a table associating software modules with the state information.

FIG. 3 illustrates one embodiment of a table 44 associating software modules 42 with state information 40, such as transition information 102. Table 44 includes columns 110, 112, and 114. Column 110 includes transition information 102. Column 112 includes information defining the connector event and/or redundancy event associated with corresponding transition information 102. Column 114 includes information addressing, linking, or otherwise referencing a software module 42 associated with corresponding transition information 102. Rows 116 of table 44 include information associating software modules 42 with a transition in operational states of circuit board 16 in response to connector events, such as inserting and removing circuit cards 20. Rows 118 include information associating software modules 42 with a transition in operational states of circuit board 16 in response to redundancy events, such as enabling and disabling the redundancy mode of circuit board 16. Processor 12 does not modify hardware/software construct 18 in response to any of the state transitions defined by transition information 102 in rows 118. Therefore, column 114 of table 44 does not include any information associating a software module 42 with transition information 102 stored in rows 118. Rows 120 include information associating software modules 42 with a transition in operational states of circuit board 16 in response to connector events and redundancy events.

A software module 42 configures the various components of hardware/software construct 18 in a particular manner based upon the particular state transitions of circuit board 16 as determined by processor 12. The following examples of software modules 42 and their functionality relate to one embodiment of system 10, and it should be understood that software modules 42 may operate with any suitable functionality appropriate for the particular hardware/software construct 18 associated with system 10. For example, software module 42ab operates in response to a transition from a first state defined by state status information 100a to a second state defined by state status information 100b. Therefore, software module 42ab is associated with a state transition defined by state transition information 102ab occurring in response to the coupling of circuit card 20a with connector 50a. Similarly, software modules 42cd, 42ef, and 42gh are associated with state transitions defined by state transition information 102cd, 102ef, and 102gh, respectively.

Software modules 42ab, 42cd, and 42ef each activate IDE 94a for operation in system 10. Software module 42gh generally does not activate IDE 94a because IDE 94a is already activated for a state transition defined by state transition information 102gh. Software modules 42ab, 42cd, 42ef, and 42gh further associate IDE 94a with RDS 92a and instruct IDE 94a to reset, initialize, or otherwise reconfigure hardware 90a. In particular, RDS 92a reconfigures hardware 90*a* on behalf of IDE 94*a* and any other components of system 10. Configured in this manner, IDE 94*a* interfaces hardware 90*a* to the various components of system 10.

Software module 42*ba* is associated with a state transition from a first state defined by state status information 100*b* to a second state defined by state status information 100*a*. Therefore, software module 42*ba* is associated with a state transition defined by state transition information 102*ba* occurring in response to the decoupling of circuit card 20*a* with connector 50*a*. Similarly, software modules 42*dc*, 42*fe*, and 42*hg* are associated with state transitions defined by state transition information 102*dc*, 102*fe*, and 102*hg*, respectively. Software modules 42*ba*, 42*dc*, 42*fe*, and 42*hg* each dissociate IDE 94*a* and RDS 92*a*. Software modules 42*ba*, 42*dc*, and 42*fe* further deactivate the operation of IDE 94*a* in system 10. Software module 42*hg* generally does not deactivate the operation of IDE 94*a*.

Software modules 42*ac* and 42*bd* are associated with state transitions defined by state transition information 102*ac* and 102*bd*, respectively, occurring in response to the coupling of circuit card 20*b* with connector 50*b*. Software modules 42*ac* and 42*bd* activate IDE 94*b* for operation in system 10. Software modules 42*ac* and 42*bd* further associate IDE 94*b* with RDS 92*b* and instruct IDE 94*b* to reset, initialize, or otherwise reconfigure hardware 90*b*. In particular, RDS 92*b* reconfigures hardware 90*b* on behalf of IDE 94*b*. Configured in this manner, IDE 94*b* interfaces hardware 90*b* to various components of system 10.

Software modules 42*ca* and 42*db* are associated with state transitions defined by state transition information 102*ca* and 102*db*, respectively, occurring in response to the decoupling of circuit card 20*b* with connector 50*b*. Software modules 42*ca* and 42*db* dissociate IDE 94*b* from RDS 92*b* and deactivate the operation of IDE 94*b* in system 10.

Software modules 42*eg* and 42*fh* are associated with state transitions of circuit board 16 defined by state transition information 102*eg* and 102*fh*, respectively, occurring in response to the coupling of circuit card 20*b* with connector 50*b*. Software module 42*eg* activates IDE 94*a* for operation in system 10. Software module 42*fh* generally does not activate the operation of IDE 94*a* because IDE 94*a* is already activated for a state transition defined by state transition information 102*fh*. Software modules 42*eg* and 42*fh* further associate IDE 94*a* with RDS 92*b* and instruct IDE 94*a* to reset, initialize, or otherwise reconfigure hardware 90*b*. In particular, RDS 92*b* reconfigures hardware 90*b* on behalf of IDE 94*a*. Configured in this manner, IDE 94*a* interfaces hardware 90*b* to various components of system 10.

Software modules 42*ge* and 42*hf* are associated with state transitions of circuit board 16 defined by state transition information 102*ge* and 102*hf*, respectively, occurring in response to the decoupling of circuit card 20*b* with connector 50*b*. Software modules 42*ge* and 42*hf* dissociate IDE 94*a* and RDS 92*b*. Software module 42*ge* further deactivates the operation of IDE 94*a* in system 10. Software module 42*hf* generally does not deactivate the operation of IDE 94*a*.

Software module 42*cg* is associated with a state transition of circuit board 16 defined by state transition information 102*cg* occurring in response to the enabling of a redundancy mode. Software module 42*cg* dissociates IDE 94*b* and RDS 92*b* and deactivates the operation of IDE 94*b* in system 10. Module 42*cg* further activates IDE 94*a* for operation in system 10, associates IDE 94*a* with RDS 92*b*, and instructs IDE 94*a* to reset, initialize, or otherwise reconfigure hardware 90*b*. In particular, RDS 92*b* reconfigures hardware 90*b* on behalf of IDE 94*a*. Configured in this manner, IDE 94*a* interfaces hardware 90*b* to the various components of system 10.

Software module 42*gc* is associated with a state transition of circuit board 16 defined by state transition information 102*gc* occurring in response to the disabling of the redundancy mode. Software module 42*gc* dissociates IDE 94*a* and RDS 92*b* and deactivates the operation of IDE 94*a* in system 10. Software module 42*gc* further activates IDE 94*b* for operation in system 10, associates IDE 94*b* with RDS 92*b*, and instructs IDE 94*b* to reset, initialize, or otherwise reconfigure hardware 90*b*. In particular, RDS 92*b* reconfigures hardware 90*b* on behalf of IDE 94*b*. Configured in this manner, IDE 94*b* interfaces hardware 90*b* to the various components of system 10.

Software module 42*dh* is associated with a state transition of circuit board 16 defined by state transition information 102*dh* occurring in response to the enabling of the redundancy mode. Software module 42*dh* dissociates RDS 92*b* and IDE 94*b* and deactivates the operation of IDE 94*b* in system 10. Software module 42*dh* further associates IDE 94*a* with RDS 92*b*. Therefore, IDE 94*a* is associated with both RDS 92*a* and RDS 92*b*. Software module 42*dh* instructs IDE 94*a* to reset, initialize, or otherwise reconfigure hardware 90*a* and hardware 90*b*. In particular, RDS 92*a* reconfigures hardware 90*a* and RDS 92*b* reconfigures hardware 90*b*, on behalf of IDE 94*a*. Configured in this manner, IDE 94*a* interfaces hardware 90*a* and 90*b* to various components of system 10.

Software module 42*hd* is associated with a state transition of circuit board 16 defined by state transition information 102*hd* occurring in response to the disabling of the redundancy mode. Software module 42*hd* dissociates RDS 92*b* and IDE 94*a*. Software module 42*hd* further activates IDE 94*b* for operation in system 10, associates IDE 94*b* with RDS 92*b*, and instructs IDE 94*a* and IDE 94*b* to reset, initialize, or otherwise reconfigure hardware 90*a* and hardware 90*b*, respectively. Configured in this manner, IDE 94*a* and IDE 94*b* interface hardware 90*a* and hardware 90*b* to various components of system 10, respectively. Therefore, IDE 94*b* operates independently from IDE 94*a*.

Software module 42*ag* is associated with a state transition of circuit board 16 defined by state transition information 102*ag* occurring in response to the enabling of the redundancy mode and the coupling of circuit card 20*b* with connector 50*b*. Software module 42*ag* activates IDE 94*a* for operation in system 10, associates IDE 94*a* with RDS 92*b*, and instructs IDE 94*a* to reset, initialize, or otherwise reconfigure hardware 90*b*. In particular, RDS 92*b* reconfigures hardware 90*b* on behalf of IDE 94*a*. Configured in this manner, IDE 94*a* interfaces hardware 90*b* to various components of system 10.

Software module 42*af* is associated with a state transition defined by state transition information 102*af* occurring in response to the enabling of the redundancy mode and the coupling of circuit card 20*a* with connector 50*a*. Software module 42*af* activates IDE 94*a* for operation in system 10, associates IDE 94*a* with RDS 92*a*, and instructs IDE 94*a* to reset, initialize, or otherwise reconfigure hardware 90*a*. In particular, RDS 92*a* reconfigures hardware 90*a* on behalf of IDE 94*a*. Configured in this manner, IDE 94*a* interfaces hardware 90*a* to various components of system 10.

Software module 42*ah* is associated with a state transition defined by state transition information 102*ah* occurring in response to the enabling of the redundancy mode, the coupling of circuit card 20*a* with connector 50*a*, and the coupling of circuit card 20b with connector 50b. Software module 42ah activates IDE 94a for operation in system 10, associates IDE 94a with RDS 92a and RDS 92b, and instructs IDE 94a to reset, initialize, or otherwise reconfigure hardware 90a and hardware 90b. In particular, RDS 92a and RDS 92b reconfigure hardware 90a and hardware 90b, respectively, on behalf of IDE 94a. Configured in this manner, IDE 94a interfaces hardware 90a and hardware 90b to various components of system 10.

Figure 4:
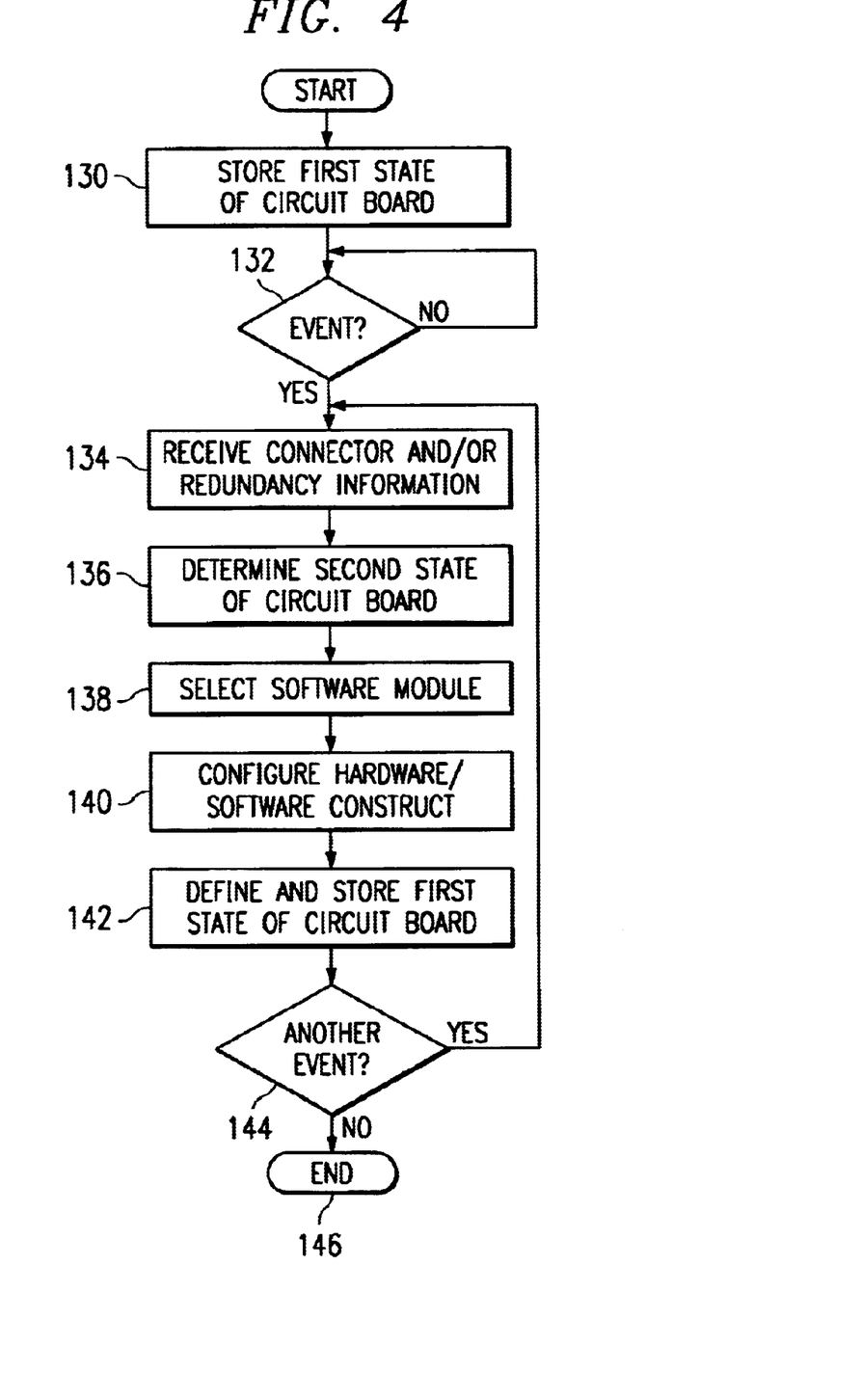
FIG. 4 illustrates a flowchart of an exemplary method for processing circuit card connector and redundancy events.

FIG. 4 illustrates a flowchart of an exemplary method for processing circuit card connector and redundancy events. The method begins at step 130 where processor 12 stores a first state of circuit board 16 in memory 14. System 10 determines whether an event is detected at step 132. The event may be a connector event and/or a redundancy event. The first state of circuit board 16 stored at step 130 indicates whether circuit card 20a was coupled to connector 50a prior to the event detected at step 132; whether circuit card 20b was coupled to connector 50b prior to the event detected at step 132; and whether circuit board 16 was operating in the redundancy mode prior to the event detected at step 132.

If an event is detected at step 132, execution proceeds to step 134 where processor 12 receives connector information 70 and/or redundancy information 72. Processor 12 determines the second state of circuit board 16 at step 136, based upon the information received at step 134. The second state of circuit board 16 indicates whether circuit card 20a is coupled to connector 50a subsequent to the event detected at step 132; whether circuit card 20b is coupled to connector 50b subsequent to the event detected at step 132; and whether circuit board 16 is operating in the redundancy mode subsequent to the event detected at step 132.

Execution proceeds to step 138 where processor 12 selects a software module 42 for execution based upon the first state of circuit board 16 and the second state of circuit board 16. In particular, processor 12 selects a particular software module 42 for execution based upon state transition information 102 associated with the first state and the second state of circuit board 16, as described above with reference to FIG. 3. Processor 12 executes the selected software module 42 at step 140 to configure hardware/software construct 18 in a manner consistent with the operational states of circuit board 16.

Processor 12 prepares to process any subsequent connector and/or redundancy events by defining and storing the current state of circuit board 16, such as the second state determined at step 136, as the new first state of circuit board 16, at step 142. System 10 determines whether another event has occurred at step 144. If so, execution returns to step 134. If not, execution terminates at step 146. Although the method illustrated in FIG. 4 is described with reference to the serial processing of connector and/or redundancy events, it should be understood that in a particular embodiment of system 10 processor 12 may process multiple events substantially simultaneously.

Although the present invention has been described with several embodiments, a myriad of changes, variations, alterations, transformations, and modifications may be suggested to one skilled in the art, and it is intended that the present invention encompasses such changes, variations, alterations, transformations, and modifications as fall within the spirit and scope of the appended claims.

What is claimed is:

1. A system for processing circuit card events, comprising:

a circuit board having a first connector and a second connector, the circuit board operable to generate connector information indicating whether a first circuit card is coupled to the first connector and whether a second circuit card is coupled to the second connector;

a memory operable to store a plurality of software modules and a first state of the circuit board; and a processor coupled to the circuit board and the memory, the processor operable to:

determine a second state of the circuit board based upon the connector information; and select at least one software module for execution, the software module selected based upon the first state and the second state of the circuit board.

2. The system of claim 1, wherein the circuit board comprises a portion of a communication device for use in a communication system.

3. The system of claim 1, wherein the circuit board comprises:

a detector operable to generate the connector information in response to a connector event; and an interface operable to communicate the connector information to the processor.

4. The system of claim 3, wherein the connector event comprises one of a coupling of the first circuit card with the first connector or a decoupling of the first circuit card from the first connector.

5. The system of claim 3, wherein the connector event comprises one of a coupling of the second circuit card with the second connector or a decoupling of the second circuit card from the second connector.

6. The system of claim 3, wherein the first state of the circuit board indicates whether the first circuit card was coupled to the first connector prior to the connector event and whether the second circuit card was coupled to the second connector prior to the connector event.

7. The system of claim 3, wherein the second state of the circuit board indicates whether the first circuit card is coupled to the first connector subsequent to the connector event and whether the second circuit card is coupled to the second connector subsequent to the connector event.

8. The system of claim 1, wherein the circuit board is further operable to generate redundancy information indicating whether the circuit board is operating in a redundancy mode in which the first circuit card performs a particular function and the second circuit card performs substantially the same function.

9. The system of claim 8, wherein the processor is further operable to determine the second state of the circuit board based upon the redundancy information.

10. The system of claim 8, wherein the circuit board generates the redundancy information in response: to a redundancy event, the redundancy event comprising one of enabling the redundancy mode or disabling the redundancy mode.

11. The system of claim 10, wherein the first state of the circuit board indicates whether the circuit board was operating in a redundancy mode prior to the redundancy event.

12. The system of claim 10, wherein the second state of the circuit board indicates whether the circuit board is operating in the redundancy mode subsequent to the redundancy event.

13. The system of claim 1, further comprising a construct, wherein the selected software module is operable to configure the construct based upon the first state and the second state of the circuit board.

14. The system of claim 13, wherein the construct comprises:

a hardware component associated with a circuit card;

a software data structure associated with the hardware component; and an interface coupled to the software data structure and operable to control the hardware component using the software data structure.

15. The system of claim 1, wherein:

the memory comprises a queue operable to store connector information indicating a particular order of connector events that occur for at least one of the first circuit card and the second circuit card; and the processor is further operable to determine the second state of the circuit board based upon any of the connector events.

16. The system of claim 1, wherein:

the memory is further operable to store connector information indicating a plurality of connector events that occur for at least one of the first circuit card and the second circuit card; and the processor is further operable to determine the second state of the circuit board based upon a plurality of the connector events.

17. The system of claim 1, wherein the processor selects a first software module for execution if the first circuit card is coupled to the first connector and the second circuit card is decoupled from the second connector, and a second software module for execution if the first circuit card is coupled to the first connector and the second circuit card is coupled to the second connector.

18. The system of claim 8, wherein:

the memory is further operable to store:

connector information indicating a plurality of connector events that occur for at least one of the first circuit card and the second circuit card; and redundancy information indicating whether the circuit board is operating in a redundancy mode; and the processor is further operable to determine the second state of the circuit board based upon any of the plurality of connector events and the redundancy information.

19. The system of claim 13, wherein the software module is operable to associate at least one interface description entity of the construct with a hardware component of the construct, the at least one interface description entity operable to interface the hardware component with other components of the system.

20. The system of claim 13, wherein the software module is operable to associate at least one redundant data structure of the construct with a hardware component of the construct, the at least one redundant data structure operable to control the operation of the hardware component.

21. A method for processing circuit card events, comprising:

storing a first state of a circuit board;

receiving connector information indicating whether a first circuit card is coupled to a first connector of the circuit board and whether a second circuit card is coupled to a second connector of the circuit board;

determining a second state of the circuit board based upon the connector information; and selecting at least one software module to execute based upon the first state and the second state of the circuit board.

22. The method of claim 21, further comprising generating the connector information in response to a connector event.

23. The method of claim 22, wherein the connector event comprises one of a coupling of the first circuit card with the first connector or a decoupling of the first circuit card from the first connector.

24. The method of claim 22, wherein the connector event comprises one of a coupling of the second circuit card with the second connector or a decoupling of the second circuit card from the second connector.

25. The method of claim 22, wherein the first state of the circuit board indicates whether the first circuit card was coupled to the first connector prior to the connector event and whether the second circuit card was coupled to the second connector prior to the connector event.

26. The method of claim 22, wherein the second state of the circuit board indicates whether the first circuit card is coupled to the first connector subsequent to the connector event and whether the second circuit card is coupled to the second connector subsequent to the connector event.

27. The method of claim 21, further comprising generating redundancy information indicating whether the circuit board is operating in a redundancy mode in which the first circuit card performs a particular function and the second circuit card performs substantially the same function.

28. The method of claim 27, wherein the step of determining the second state further comprises determining the second state of the circuit board based upon the redundancy information.

29. The method of claim 27, wherein the step of generating redundancy information further comprises generating the redundancy information in response to a redundancy event, the redundancy event comprising one of enabling the redundancy mode or disabling the redundancy mode.

30. The method of claim 29, wherein the first state of the circuit board indicates whether the circuit board was operating in a redundancy mode prior to the redundancy event.

31. The method of claim 29, wherein the second state of the circuit board indicates whether the circuit board is operating in the redundancy mode subsequent to the redundancy event.

32. The method of claim 27, wherein:

the connector information further indicates a plurality of connector events that occur for at least one of the first circuit card and the second circuit card; and determining comprises determining the second state of the circuit board based upon any of the plurality of connector events and the redundancy information.

33. The method of claim 21, further comprising configuring a construct using the selected software module based upon the first state and the second state of the circuit board.

34. The method of claim 33, wherein the construct comprises:

a hardware component associated with a circuit card;

a software data structure associated with the hardware component; and an interface coupled to the software data structure and operable to control the hardware component using the software data structure.

35. The method of claim 33, wherein the selected software module associates at least one interface description entity of the construct with a hardware component of the construct, the at least one interface description entity operable to interface the hardware component with other components of a system.

36. The method of claim 33, wherein the selected software module associates at least one redundant data structure of the construct with a hardware component of the construct, the at least one redundant data structure operable to control the operation of the hardware component.

37. The method of claim 21, wherein:

the connector information further indicates a particular order of connector events that occur for at least one of the first circuit card and the second circuit card; and determining comprises determining the second state of the circuit board based upon any of the connector events.

38. The method of claim 21, wherein:
the connector information further indicates a plurality of connector events that occur for at least one of the first circuit card and the second circuit card; and
determining comprises determining the second state of the circuit board based upon a plurality of the connector events.

39. The method of claim 21, wherein selecting further comprises selecting a first software module for execution if the first circuit card is coupled to the first connector and the second circuit card is decoupled from the second connector, and selecting a second software module for execution if the first circuit card is coupled to the first connector and the second circuit card is coupled to the second connector.

40. An apparatus for processing circuit card events, comprising:
a memory operable to store a plurality of software modules and a first state of a circuit board; and
a processor coupled to the memory, the processor operable to:
determine a second state of the circuit board based upon connector information that indicates whether a first circuit card is coupled to a first connector of the circuit board and whether a second circuit card is coupled to a second connector of the circuit board; and
select one of the plurality of software modules for execution based upon the first state and the second state of the circuit board.

41. The apparatus of claim 40, wherein the circuit board comprises:
a detector operable; to generate the connector information in response to a connector event; and
an interface operable to communicate the connector information to the processor.

42. The apparatus of claim 41, wherein the connector event comprises one of a coupling of the first circuit card with the first connector or a decoupling of the first circuit card from the first connector.

43. The apparatus of claim 41, wherein the connector event comprises one of a coupling of the second circuit card with the second connector or a decoupling of the second circuit card from the second connector.

44. The apparatus of claim 41, wherein the first state of the circuit board indicates whether the first circuit card was coupled to the first connector prior to the connector event and whether the second circuit card was coupled to the second connector prior to the connector event.

45. The apparatus of claim 41, wherein the second state of the circuit board indicates whether the first circuit card is coupled to the first connector subsequent to the connector event and whether the second circuit card is coupled to the second connector subsequent to the connector event.

46. The apparatus of claim 40, wherein the circuit board is further operable to generate redundancy information indicating whether the circuit board is operating in a redundancy mode in which the first circuit card performs a particular function and the second circuit card performs substantially the same function.

47. The apparatus of claim 46, wherein the processor is further operable to determine the second state of the circuit board based upon the redundancy information.

48. The apparatus of claim 46, wherein the circuit board generates the redundancy information in response to a redundancy event, the redundancy event comprising one of enabling the redundancy mode or disabling the redundancy mode.

49. The apparatus of claim 48, wherein the first state of the circuit board indicates whether the circuit board was operating in a redundancy mode prior to the redundancy event.

50. The apparatus of claim 48, wherein the second state of the circuit board indicates whether the circuit board is executing in the redundancy mode subsequent to the redundancy event.

51. The apparatus of claim 46, wherein:
the memory is further operable to store:
connector information indicating a plurality of connector events that occur for at least one of the first circuit card and the second circuit card; and
redundancy information indicating whether the circuit board is operating in a redundancy mode; and
the processor is further operable to determine the second state of the circuit board based upon any of the plurality of connector events and the redundancy information.

52. The apparatus of claim 40, wherein the selected software module is operable to configure a construct based upon the first state and the second state of the circuit board.

53. The system of claim 52, wherein the construct comprises:
a hardware component associated with a circuit card;
a software data structure associated with the hardware component; and
an interface coupled to the software data structure and operable to control the hardware component using the software data structure.

54. The apparatus of claim 52, wherein the software module is operable to associate at least one interface description entity of the construct with a hardware component of the construct, the at least one interface description entity operable to interface the hardware component with other components of the apparatus.

55. The apparatus of claim 52, wherein the software module is operable to associate at least one redundant data structure of the construct with a hardware component of the construct, the at least one redundant data structure operable to control the operation of the hardware component.

56. The apparatus of claim 40, wherein:
the memory comprises a queue operable to store connector information indicating a particular order of connector events that occur for at least one of the first circuit card and the second circuit card; and
the processor is further operable to determine the second state of the circuit board based upon any of the connector events.

57. The apparatus of claim 40, wherein:
the memory is further operable to store connector information indicating a plurality of connector events that occur for at least one of the first circuit card and the second circuit card; and
the processor is further operable to determine the second state of the circuit board based upon a plurality of the connector events.

58. The apparatus of claim 40, wherein the processor selects a first software module for execution if the first circuit card is coupled to the first connector and the second circuit card is decoupled from the second connector, and a second software module for execution if the first circuit card is coupled to the first connector and the second circuit card is coupled to the second connector.

* * * * *